United States Patent

[11] 3,591,289

| [72] | Inventors | Helen M. Donega<br>North Adams;<br>Thomas E. Burgess, Williamstown, both of, Mass. |
|---|---|---|
| [21] | Appl. No. | 761,975 |
| [22] | Filed | Sept. 24, 1968 |
| [45] | Patented | July 6, 1971 |
| [73] | Assignee | Sprague Electric Company<br>North Adams, Mass. |

[54] ATOMIC ABSORPTION SAMPLE CELL
8 Claims, 2 Drawing Figs.

[52] U.S. Cl. .................................................. 356/85, 356/244
[51] Int. Cl. .................................................. G01j 3/30
[50] Field of Search ......................................... 356/85—87

[56] References Cited
UNITED STATES PATENTS
3,188,180  6/1965  Holler .......................... 356/86
3,469,789  9/1969  Simmons ....................... 356/85

OTHER REFERENCES

"Absorption & Emission Spectroscopy of $C_2$, CH, and OH in Low-Pressure Oxyacetylene Flames" R. Bleekrode; PHILIPS RESEARCH REPORTS SUPPLEMENTS 7, 1967 pp. 5—9.

Primary Examiner—Ronald L. Wibert
Assistant Examiner—U. P. McGraw
Attorneys—Connolly & Hutz, Vincent H. Sweeney, James P. O'Sullivan and David R. Thornton ABSTRACT: The determination of minute amounts of specific constituents in a specimen is accomplished through atomic absorption analysis in a beam of radiated atomic spectral light. The specimen is in vaporized condition in a controlled atmosphere of a closed region and the beam is passed through the vapor so that selective absorption of the resonance lines of the beam takes place. The specific absorption is then suitably detected and measured.

- Production of High Intensity Spectral Lines.
- Preparation of Examined Material.
- Absorption of Spectral Lines.
- Detection and Recording of Absorption.

3,591,289

ATOMIC ABSORPTION SAMPLE CELL

BACKGROUND OF THE INVENTION

This invention relates to the detection and determination of extremely small amounts of elements in a specimen substance and more particularly to the determination of the quantity of a constituent of the substance by absorption of resonance lines in atomic spectral light.

The presence of an element or elements in a substance can be obtained by absorption of a specific resonance line present in the spectrum of atomic spectral radiation.

In the determination of constituents and proportion of constituents of matter by an atomic absorption spectrophotometer a small quantity of the substance to be analyzed is vaporized and in the vapor state atoms of the element to be determined absorb resonance lines of emitted spectra. The matter is analyzed by a measurement of the absorption of the radiation from an atomic spectral energy source. In the vapor, the beam of radiation is subjected to selected absorption and the composition of the analyzed material is determined by the degree of the absorption of the radiation. The amount of the absorption is detected by a sensing means in a recording device which suitably reports the distinction between the absorbed and the nonabsorbed spectra thus indicating the composition of the analyzed material.

The absorption of resonance lines by free atoms of the analyzed substance in vapor phase is desirable because it is sensitive and can be made specific for a particular element with uniform and simple preparations. The radiation source emits the characteristic line spectrum and the specimen is vaporized and put in a condition where free atoms can absorb the specific resonance lines. Existing atomic absorption spectrophotometers employ a flame for vaporizing the analyzed material which must be in solution or suspension in a liquid medium. There is, however, an undesirable change of energy distribution of the absorbing atoms which causes their absorption peaks to be broadened. This results in a lowered sensitivity.

SUMMARY OF THE INVENTION

A spectrophotometer utilizes a suitable radiating source such as a hollow cathode lamp to generate selected radiation and a closed chamber in which an analyzed specimen is vaporized in a controlled atmosphere having an increased proportion of free atoms in the necessary state for absorption and with the energy distribution of the absorbing atoms in a narrow range. The evacuated closed chamber is backfilled with an inert gas at a reduced pressure. A monochromator isolates selected spectral lines emanating from the closed chamber for making the determination and a detection system measures the light intensity.

The specimen is vaporized in the controlled atmosphere by a suitable means such as electrical resistance, induction or laser beam heating or any other means of producing a sufficient sample in the gaseous state.

It is an object of this invention to provide a spectrophotometer of improved sensitivity for absorption to result in lower detection levels.

It is another object of this invention to provide a method of atomic absorption analysis which reduces the absorption-decreasing factors.

It is a further object of this invention to provide in atomic absorption an increase of the amount of vaporized specimen which is in the necessary state for absorption to occur.

BRIEF DESCRIPTION OF THE DRAWINGS

The above and other objects of this invention will become more apparent upon consideration of the following description taken together with the accompanying drawings in which.

DETAILED DESCRIPTION OF THE INVENTION

Figure 1:
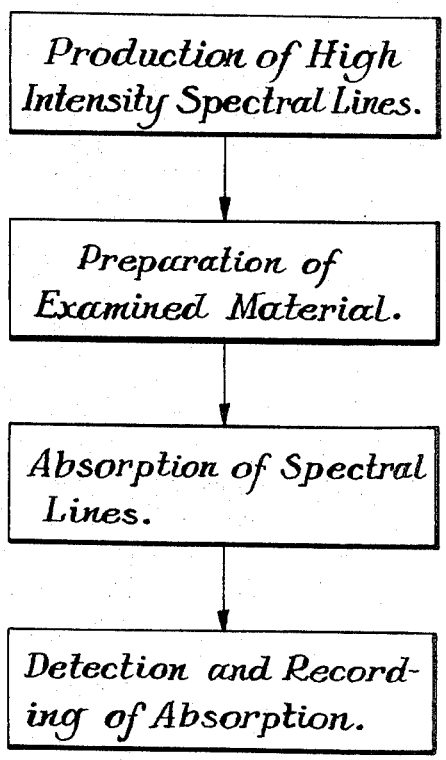
FIG. 1 is a block chart identifying steps in the analysis according to this invention.

Referring to the flow sheet of FIG. 1, the first step is the production of spectral lines by a suitable radiation source such as a hollow cathode lamp. The beam of atomic spectral radiation is directed through the controlled environment containing the vaporized sample.

The second step in the analytic procedure of this invention is the preparation for absorption including vaporization of the examined material in a closed environment. The atmosphere of this enclosed environment is controlled both by an evacuation of air and an introduction of a suitable gas to provide a desired ambient atmosphere of selected pressure in the enclosure. The vaporization of the examined material takes place in this controlled ambient atmosphere.

In the next step, the examined material is the vaporized material in the controlled environment and the element being determined absorbs the resonance lines of the atomic spectral light beam passing through the controlled environment.

Then, the amount of absorption of specific spectral lines which takes place in the controlled environment of the sample cell is detected and measured by the monochromator-detector-recorder system into which the atomic spectral light beam projects from the sample cell. The amount of absorption observed is related to the amount of that element in the examined material.

Figure 2:
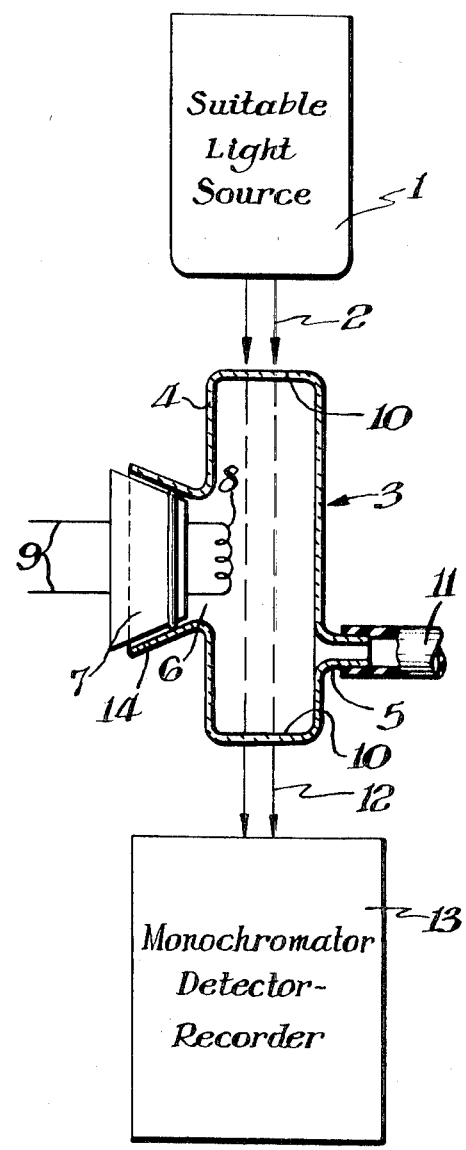
FIG. 2 is a sectional view of the analytic assembly of this invention.

Referring to the illustrated embodiment, the apparatus of this invention consists of an atomic absorption sample cell, used in conjunction with a suitable radiation source and monochromator-detector-recorder system. In FIG. 2 a suitable radiating source such as a hollow cathode lamp is shown providing an emission spectra having intense resonance lines. The emission spectra are projected into the sample cell 3. The sample cell 3 is provided with means for evaporating the sample into the enclosed sample cell in a controlled atmosphere. The absorption of the resonance lines in the emission spectra by the ground-state atoms of the element being measured takes place in the sample cell 3 and the emergent beam of radiation 12 is directed into a monochromator of the monochromator-detector-recorder 11. The monochromator-detector-recorder 11 identifies and measures the absorption of resonant radiation by the atoms of the element being measured in the evaporated sample in the cell 3.

The atomic absorption sample cell 3 has a wall structure 4 fabricated from glass. The wall structure 4 may also be metal or any other suitable material capable of withstanding reduced pressure. The wall structure 4 has a gas tube 5 and a port 6. The tube 5 provides a passage for control of the atmosphere within the wall structure 4. A plug 7 with a suitable vacuum tight seal such as an O-ring 14 is provided for closure of the port 6. A suitable sample mount 8 is provided within the cell. The type of sample mount used depends upon the method of vaporization of the sample. For example, the sample may be previously electroplated or otherwise deposited on a filament, as shown in FIG. 2, then the filament would be connected to electrodes 9 extending out through the plug 7. The sample accordingly would be vaporizable by electrical resistance heating of the filament. However, the mounting of the sample may be achieved by other means. For example, the mount may be a boat capable of being heated by electrical resistance or may be an electrically conducting mount capable of being heated by induction, or a mount capable of holding the sample so that a laser beam could impinge on this sample surface in order that vaporization of the sample would occur or any other type of sample holder which would provide a source of sample vapor within the enclosed chamber. Each end of the generally elongated wall structure 4 is provided with a window 10 of suitably transparent material. The axes of the structure 4 and the lamp 1 are aligned so that the light beam 2 passes through the structure 4 by entering and leaving through the windows 10. A gas system line 11 is attached to the tube 5 to provide suitable means for controlling the ambient atmosphere within the glass wall structure 4.

The light beam 2 after passing through the controlled atmosphere of sample cell 3 is projected through the window 10 and into the monochromator of the monochromator-detector-recorder system which detects the absorption, if any, that has taken place in the sample cell 3 and records the results.

Gas is introduced into the cell 3 through the line 11 after evacuation of air so as to provide a controlled ambient atmosphere within the enclosed region. The pressure of the ambient atmosphere is substantially less than the 760 torr of the foreign gas pressure in atomic absorption spectrophotometers employing flame vaporization of the examined specimen. The ambient atmosphere of this invention is provided at reduced pressures as low as less than 2 torr.

The gas employed to provide the controlled composition and pressure within the cell may be either an inert gas or a gas that reacts with the sample to displace the element to be measured. For example, in a determination of the element sodium, either the inert gas argon or the reactive gas hydrogen can be used.

The following example is illustrative of this invention and not limitative. The sample cell was provided with a resistance heated boat. A specimen to be examined containing sodium in solution was placed in the cell in a sample volume of 0.025 ml. The cell was evacuated to a very low pressure and then backfilled with argon to provide an argon ambient atmosphere of less than 1 torr. The sample was then evaporated to dryness producing a sodium-containing vapor within the cell. A beam of radiation was then passed through the cell and the vapor and into a detector. The detector measured as little as 0.5 parts per billion in the solution.

The observed determinations of sodium in solution and other results realized were improved over those realized through the use of the flame-atomizer system. First, the flame-atomizer system requires a sample volume of 3—5 ml. of solution and the limit of detection is 5 parts per billion in solution. Further the procedure of the above-described example provided an absolute limit of detection of $2.6 \times 10^{10}$ g. as compared with an absolute limit of $1.5 \times 10^8$ g. for the flame-atomizer system.

The advantages include control of the factors which decrease absorption and improvement of the sensitivity of the analysis. With the decrease in foreign gas pressure, the absorption by a given amount of a vaporized element is substantially increased. For example, a decrease of from 200 torr argon to 2 torr argon has been observed to give a 16 percent increase in the absorption by a given amount of sodium. Further, there is an increase in the number of atoms which are in the condition required for absorption, that is ground-state atomic vapor. The inert gas such as argon avoids the chemical combination which decreases the number of ground-state atoms.

While the foregoing detailed description of an embodiment of the invention has been set down for the purpose of illustration thereof, many variations in the details herein given may be made by those skilled in the art without departing from the spirit of the invention which is limited only by the scope of the appended claims.

What we claim is:

1. In a method of determining an element in a substance the steps of evacuating air from a closed chamber containing a sample of the substance, introducing a gas into said closed chamber to produce an ambient atmosphere having a subatmospheric pressure, evaporating said sample to provide ground-state atoms in said ambient atmosphere to produce at least some atoms of said element having energy distribution in a range which provides a capability of absorbing specific resonance lines of emitted spectral light, projecting through said chamber and said ground-state atoms in said atmosphere a beam of atomic spectral light having intense specific resonance lines in a spectrum of atomic spectral radiation including at least the characteristic line of absorption wave length of said element, absorbing the energy of the characteristic resonance line in the atomic spectral light beam by the vaporized atoms of said element, eliminating the resonance lines other than the characteristic light from said beam and detecting the characteristic light after said absorption.

2. In the method of claim 1 the step of introducing argon gas as the inert gas.

3. The method of claim 1 in which said ambient atmosphere is reduced to a pressure of no more than about 2 torr.

4. In the method of claim 1 the step of radiating the beam of atomic spectral light from a hollow cathode discharge.

5. In an apparatus for determining minute quantities of elements in a specimen substance, a chamber having a plurality of ports, means coupled to at least one of said ports for evacuating said chamber, means coupled to at least one of said ports for introducing a gas, a mount supporting a sample of the specimen substance in said chamber, means associated with said mount being capable of evaporating the sample by heating to a vapor in said chamber, an inert gas in said chamber providing an ambient atmosphere at less than atmospheric pressure which inert gas minimizes that chemical combination which decreases the number of ground-state atoms, means for projecting an atomic spectral light beam through said chamber, and mans for quantitatively determining the amount of the element in the specimen substance, said determining means including a monochromator and a photodetector.

6. In the apparatus as claimed in claim 5, said specimen-supporting mount consisting of an electrical resistance filament capable of being heated by the passage of current to vaporize the supported specimen in said chamber.

7. In the apparatus as claimed in claim 5, said specimen-supporting mount consisting of a boat capable of being heated to vaporize the supported specimen in said chamber.

8. In the apparatus as claimed in claim 5, said means for projecting an atomic spectral light beam consisting of a hollow cathode discharge lamp.